(12) United States Patent
Sly et al.

(10) Patent No.: US 11,372,108 B2
(45) Date of Patent: Jun. 28, 2022

(54) AUTOMATIC GAIN CONTROL FOR LASER DETECTOR

(71) Applicant: Rosemount Aerospace Inc., Burnsville, MN (US)

(72) Inventors: Jaime Sly, Savage, MN (US); Mark Sherwood Miller, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 830 days.

(21) Appl. No.: 16/135,866

(22) Filed: Sep. 19, 2018

(65) Prior Publication Data

US 2019/0146090 A1  May 16, 2019

Related U.S. Application Data

(60) Provisional application No. 62/562,299, filed on Sep. 22, 2017.

(51) Int. Cl.
| | |
|---|---|
| *G01S 17/00* | (2020.01) |
| *G01S 17/88* | (2006.01) |
| *G01P 5/26* | (2006.01) |
| *G01S 17/58* | (2006.01) |
| *G01S 17/95* | (2006.01) |
| *B64D 47/00* | (2006.01) |
| *G01S 7/484* | (2006.01) |
| *G01S 7/4861* | (2020.01) |
| *G01S 7/486* | (2020.01) |

(52) U.S. Cl.
CPC .............. *G01S 17/88* (2013.01); *B64D 47/00* (2013.01); *G01P 5/26* (2013.01); *G01S 7/484* (2013.01); *G01S 7/4861* (2013.01); *G01S 7/4868* (2013.01); *G01S 17/58* (2013.01); *G01S 17/95* (2013.01)

(58) Field of Classification Search
USPC ........................................................ 356/5, 1
See application file for complete search history.

(56) References Cited

U.S. PATENT DOCUMENTS

| | | | |
|---|---|---|---|
| 5,157,677 A | 10/1992 | Narhi et al. | |
| 6,804,607 B1 * | 10/2004 | Wood ...................... | G01S 17/86 |
| | | | 701/301 |

(Continued)

FOREIGN PATENT DOCUMENTS

| | | | | |
|---|---|---|---|---|
| DE | 2900398 A1 | 7/1980 | | |
| DE | 3903501 A1 * | 8/1989 | ........... | G01S 17/931 |

(Continued)

OTHER PUBLICATIONS

Extended European Search Report for European Patent No. 18195815.8 dated Feb. 20, 2019, 8 pages.

(Continued)

*Primary Examiner* — James R Hulka
(74) *Attorney, Agent, or Firm* — Kinney & Lange, P.A.

(57) ABSTRACT

A laser sensing system includes an emitter configured to emit a laser, and a controller. The intensity of the laser is based upon power provided to the laser sensing system. The controller is configured to control the power provided to the laser sensing system, obtain feedback parameters indicative in part of molecular content of the atmosphere, and control the power provided to the laser sensing system based upon the feedback parameters.

19 Claims, 3 Drawing Sheets

(56) References Cited

U.S. PATENT DOCUMENTS

| | | | |
|---|---|---|---|
| 6,995,846 B2* | 2/2006 | Kalayeh | G01N 21/39 356/437 |
| 7,042,631 B2* | 5/2006 | Smith | G02B 6/032 359/333 |
| 7,187,452 B2* | 3/2007 | Jupp | G01S 7/497 356/501 |
| 7,616,294 B2* | 11/2009 | Lacondemine | G01S 17/58 356/28 |
| 8,306,077 B2* | 11/2012 | Pushkarsky | B82Y 20/00 372/32 |
| 8,736,818 B2 | 5/2014 | Weimer et al. | |
| 8,976,340 B2 | 3/2015 | Gilliland et al. | |
| 2003/0063884 A1* | 4/2003 | Smith | G02B 6/032 385/129 |
| 2004/0130702 A1* | 7/2004 | Jupp | G01S 17/89 356/5.01 |
| 2005/0134859 A1* | 6/2005 | Kalayeh | G01N 21/39 356/437 |
| 2006/0262324 A1* | 11/2006 | Hays | G01S 17/89 356/519 |
| 2007/0097350 A1 | 5/2007 | Halama | |
| 2009/0033911 A1 | 2/2009 | Lacondemine et al. | |
| 2010/0111122 A1 | 5/2010 | Pushkarsky et al. | |
| 2012/0038903 A1* | 2/2012 | Weimer | G01S 7/4868 356/4.07 |
| 2012/0050750 A1* | 3/2012 | Hays | G01S 17/003 356/519 |
| 2012/0261516 A1* | 10/2012 | Gilliland | B64D 39/00 244/183 |
| 2017/0242108 A1* | 8/2017 | Dussan | G01S 7/487 |
| 2018/0088238 A1* | 3/2018 | Garde | G01S 17/88 |

FOREIGN PATENT DOCUMENTS

| | | |
|---|---|---|
| DE | 3903501 A1 | 8/1989 |
| EP | 1783513 A2 | 9/2007 |
| EP | 3301457 A1 | 4/2018 |

OTHER PUBLICATIONS

Extended European Search Report for European Patent No. 18195405.8 dated Feb. 19, 2019, 9 pages.

* cited by examiner

US 11,372,108 B2

AUTOMATIC GAIN CONTROL FOR LASER DETECTOR

CROSS-REFERENCE TO RELATED APPLICATION(S)

This application claims the benefit of U.S. Provisional Application No. 62/562,299 filed Sep. 22, 2017.

BACKGROUND

The present invention relates generally to laser sensing systems, and in particular to a system and method for controlling aircraft laser remote sensors.

Remote detection sensors using light detection and ranging (LIDAR) methodologies may be utilized, for example, to monitor the environment external to an aircraft. In order to address performance or availability of these systems, non-eye safe lasers may be required. Eye safety during on ground operations, taxi, takeoff, and landing phases of operation may be critical for certification of these systems.

Advisory circular guidance (e.g., ref. AC 20-183) for aircraft installed LIDAR systems recommends addressing eye safety by shuttering or turning off the laser system during on ground, taxi, takeoff, and landing phases of operation. However, this is for non-critical systems. For systems that are critical to the operation of the aircraft, this may be impractical. Critical systems may need to provide, for example, power-up built-in-test results demonstrating that the system is functional prior to flight and may also need to begin providing preliminary measurement data to support taxi and takeoff operations. Thus, it is desirable to allow laser systems to begin operation and performance of fault checking while the aircraft is on the ground.

Additionally, the laser power required to make the desired measurements for the aircraft LIDAR is typically designed for worst case conditions in order to meet data latency and performance requirements. These requirements may be driven by a corner of the flight envelope or a particular failure mode, for example. However, this may be more power than what is necessary for the majority of operation of the aircraft. It is desirable to be able to reduce the power level of the laser during aircraft operations where possible.

SUMMARY

A method of controlling power for a laser sensing system on an aircraft, wherein a laser of the laser sensing system is emitted into an atmosphere external to the aircraft, the method includes powering the laser sensing system at a first power level; obtaining, by a controller of the laser sensing system, feedback parameters regarding the laser, wherein the feedback parameters are indicative of molecular content of the atmosphere; determining, by the controller, a gain based upon the feedback parameters; and adjusting the first power level to a second power level based upon the gain.

A laser sensing system includes an emitter configured to emit a laser, and a controller. The intensity of the laser is based upon power provided to the laser sensing system. The controller is configured to control the power provided to the laser sensing system, obtain feedback parameters indicative in part of molecular content of the atmosphere, and control the power provided to the laser sensing system based upon the feedback parameters.

An aircraft system includes a laser sensing system configured to emit a laser into atmosphere external to the aircraft, and a controller. The controller is configured to receive feedback parameters indicative at least in part of molecular content of the atmosphere and is configured to adjust power to the laser sensing system based upon the feedback parameters.

DETAILED DESCRIPTION

Figure 1:
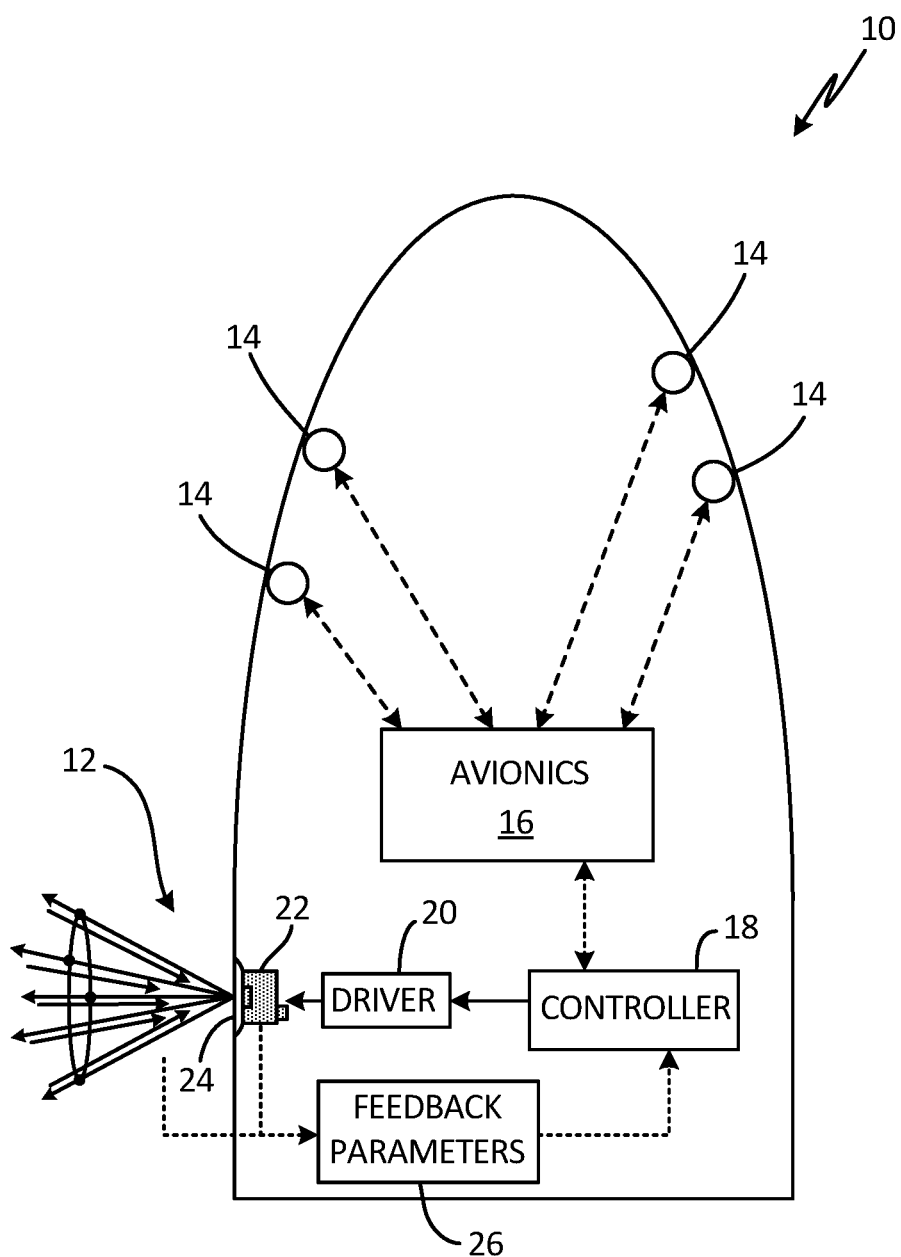
FIG. 1 is a diagram illustrating an aircraft that includes a laser sensing system.

FIG. 1 is a diagram illustrating an aircraft 10 that includes laser sensing system 12. Aircraft 10 also includes sensors 14, and avionics 16. Laser sensing system 12 may be any sensor or system that includes a laser or other optical light source and is configured to project the laser out of the aircraft into the atmosphere and capture an optical response (e.g., backscatter) of the laser from the atmosphere. For example, laser sensing system 12 may be an air data sensing system, optical icing conditions detector, or other device that utilizes light detection and ranging (LIDAR). Laser sensing system 12 may be configured to emit a laser beam out of aircraft 10 and receive and analyze backscatter of the beam in order to determine characteristics such as cloud content or air data, for example. In the embodiment illustrated in FIG. 1, laser sensing system 12 includes controller 18, driver 20, laser emitter and detector 22, and window 24. While illustrated as a single block, laser emitter and detector 22 may be separate devices such as a laser emitter and a photo-diode, for example.

Data may be collected for aircraft 10 using sensors 14, for example. Sensors 14, in conjunction with avionics 16 and/or other onboard computer systems, may be configured to determine aircraft conditions including, but not limited to, airspeed, pressure, temperature, altitude, angle of attack, weight on wheels, throttle lever angle, ground speed, aircraft coordinates (via global positioning system (GPS), for example), and many others. This data may be provided to controller 18 of laser sensing system 12 such that the sensed and determined conditions may be used by control algorithms of laser sensing system 12, for example.

Because laser sensing system 12 emits a laser beam through window 24 of aircraft 10 into the external environment, for example, regulations may require eye safety while aircraft 10 is on the ground. In the past, for non-critical lasers implemented on aircraft, eye safety was ensured by requiring the laser to be turned off or shuttered while the aircraft is on the ground. However, requiring the laser to be turned off or shuttered may not be practical in certain applications. For example, laser sensing system 12, or the system that includes laser sensing system 12, may be safety critical, requiring on-ground checks to ensure proper functionality prior to flight of aircraft 10.

Figure 2:
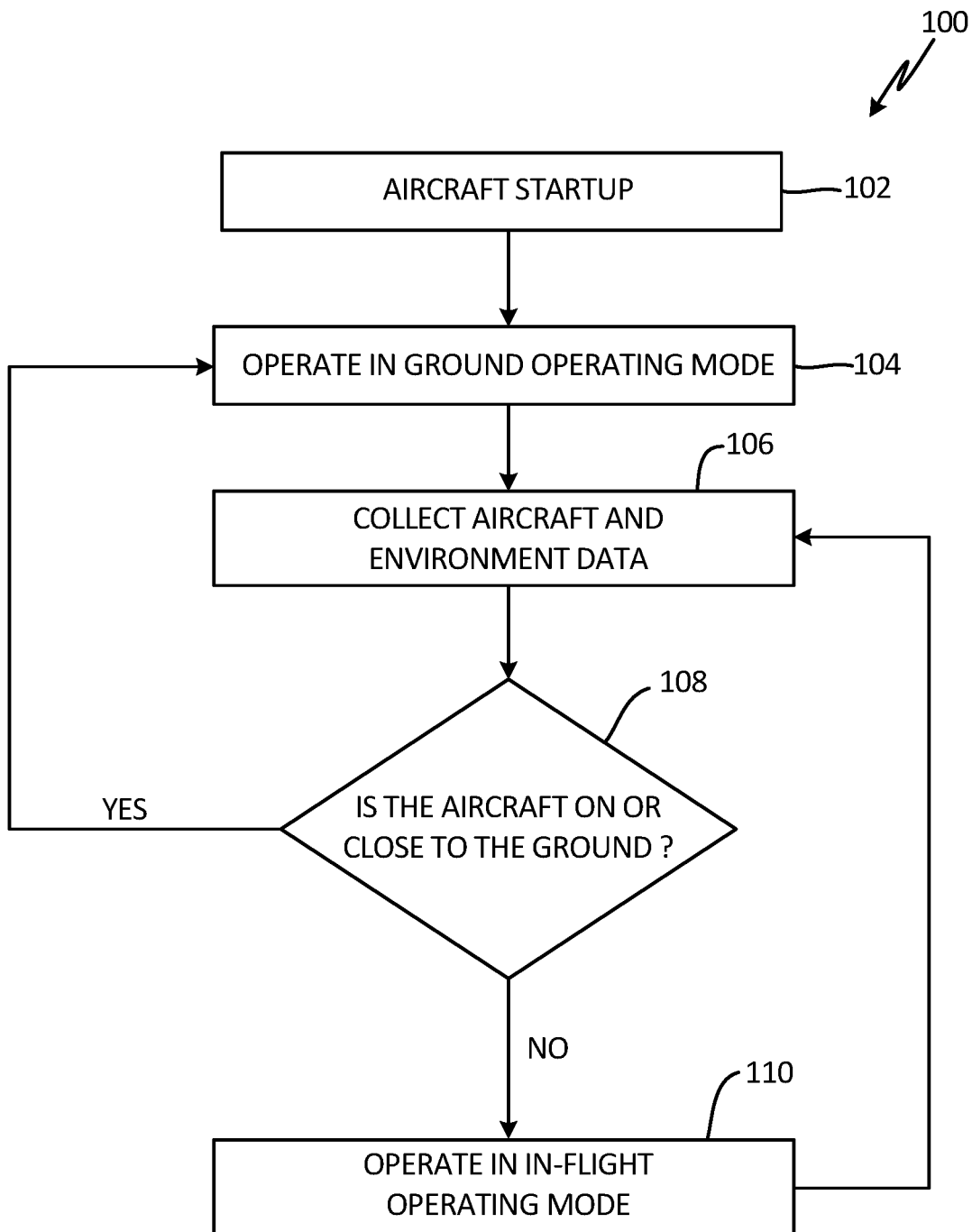
FIG. 2 is a flowchart illustrating a method of operating a laser sensing system in separate operating modes.

FIG. 2 is a flowchart illustrating method 100 of operating laser sensing system 12 in separate operating modes. For example, laser sensing system 12 may be operated in two operating modes. The first operating mode may be a ground operating mode and the second operating mode may be an in-flight operating mode. While in ground operating mode, laser sensing system 12 may be operated in a low power mode such that the laser emitted by laser sensing system 12 is at eye safe levels. Eye safety levels may be defined by the United States Food and Drug Administration (FDA) in 21 CFR 1040.10 and 21 CFR 1040.11, for example, or by other regulatory entities.

At step 102, aircraft 10 is started up or otherwise prepared for flight. At startup of aircraft 10, laser sensing system 12 may enter a default operating mode. For example, at step 102, aircraft 10 may be parked at the gate and preparing for an upcoming flight. In the embodiment illustrated in FIG. 2, the default operating mode of laser sensing system 12 is the ground operating mode and thus, following startup of aircraft 10, at step 104, laser sensing system 12 operates in ground operating mode. At step 106, aircraft and environment data is collected. For example, sensors 14, avionics 16, and/or other onboard systems may be utilized to collect information such as, among others, airspeed, groundspeed, weight on wheels, throttle level angle, and GPS data.

At step 108, it is determined if aircraft 10 is operating in a certain operating mode or phase. For example, the operating mode may be that aircraft 10 is operating on the ground. This determination may be made by avionics 16, controller 18, and/or any other computer system onboard aircraft 10. The determination may be made using data obtained during step 106. For example, weight on wheels, altitude, throttle level angle, or other sensed conditions may be used to determine that aircraft 10 is on the ground. If it is determined by controller 18 or another computer system that aircraft 10 is on the ground, method 100 returns to step 104 and laser sensing system 12 begins, or continues, operating in ground operating mode.

While in ground operating mode, laser sensing system 12 may be operated in a low power mode. In low power mode, laser sensing system 12 may ensure that the laser emitted by laser sensing system 12 is emitted at eye safety levels. These levels may be defined by FDA regulations 21 CFR 1040.10 and 21 CFR 1040.11, for example, or by requirements defined by other regulatory entities. While operating at lower power, laser sensing system 12 may require longer integration times and/or may have reduced accuracy. However, this may be acceptable to perform ground checks of laser sensing system 12, and/or begin collecting data while aircraft 10 is on the ground.

If aircraft 10 is not on the ground, as determined at step 108, method 100 proceeds to step 110 and laser sensing system 12 is operated in an in-flight operating mode. During in-flight operating mode, the laser of laser sensing system 12 may be operated at a full operational power level. Because aircraft 10 is in flight, the laser of laser sensing system 12 may be operated at a level that is above eye safety levels, for example. During in-flight operating mode, the power to the laser of laser sensing system 12 may be varied as described with respect to FIG. 3. If laser sensing system 12 is an air data sensing system, for example, the power level may be adjusted based upon the total received return intensity at detector 22 while laser sensing system 12 is operated in the in-flight mode. Method 100 may be repeated for the entirety of operation of aircraft 10.

While described as a ground operating mode and an in-flight operating mode, additional or alternative operational modes may be defined for laser sensing system 12. For example, it may be desirable for aircraft 10 to reach a certain altitude prior to emitting laser energy above eye safe levels. In another embodiment, the second operational mode may be beyond a speed threshold. For example, the nominal ocular hazard distance (NOHD) and/or dwell time of the laser may be such that while the aircraft is accelerating for takeoff, it can be guaranteed that no persons will be within a range of the laser of sensing system 12 such that eye safety is an issue. Thus, laser sensing system 12 may be able to operate in a normal operating mode prior to takeoff of aircraft 10, following detection of a threshold groundspeed.

Any method for reducing the intensity of the laser emitted by laser sensing system 12 may be utilized. For example, if laser sensing system 12 employs a single stage laser, controller 18 may adjust a drive current provided to driver circuit 20. This current may be selected such that it is guaranteed that the laser emitted by laser sensing system 12 is at eye safety levels. Eye safety levels may be assessed as a radian power defined as eye-safe at the window or other surface of laser sensing system 12, or may be assessed as eye-safe at a reasonable NOHD around laser sensing system 12, for example.

During normal operation of laser sensing system 12, such as during step 110 of method 100, the power provided to drive the laser of laser sensing system 12 may be continuously adjusted based upon the needs of the system. For example, laser sensing system 12 may be an air data sensing system or other optical sensor configured to measure characteristics of the atmosphere external to aircraft 10. For LIDAR air data sensing systems, for example, a stronger return signal (e.g., molecular or aerosol backscatter) is typically available at the receiving optics of the laser sensing system when aircraft 10 is at lower altitudes. This is due to the increased density of the molecules or greater concentration of aerosols in the air at lower altitudes.

Emitter and detector 22 may include a photo-diode, for example, configured to receive the backscatter and convert the backscatter into an electronic signal for controller 18. At lower altitudes, increased backscatter return increases the intensity of the light received at the detector. If there is too much return, the detector could saturate, driving error into the method of measurement. In another example, detector 22 may include a photon counter. When there are a large number of photons, a detection circuit that utilizes a photon counter may miss some of the received photons. Thus, it is desirable for controller 18 to implement a control algorithm to optimize the signal intensity for the detection circuit.

Additionally, there may be flight phases for which a faster measurement by laser sensing system 12 is required. In this situation, the power for laser sensing system 12 may be increased to increase the signal intensity such that laser sensing system 12 may calculate the sensing system results with a lower latency. The power may then be decreased for flight phases for which this performance is not required, tolerating longer latencies in favor of reduced power.

Figure 3:
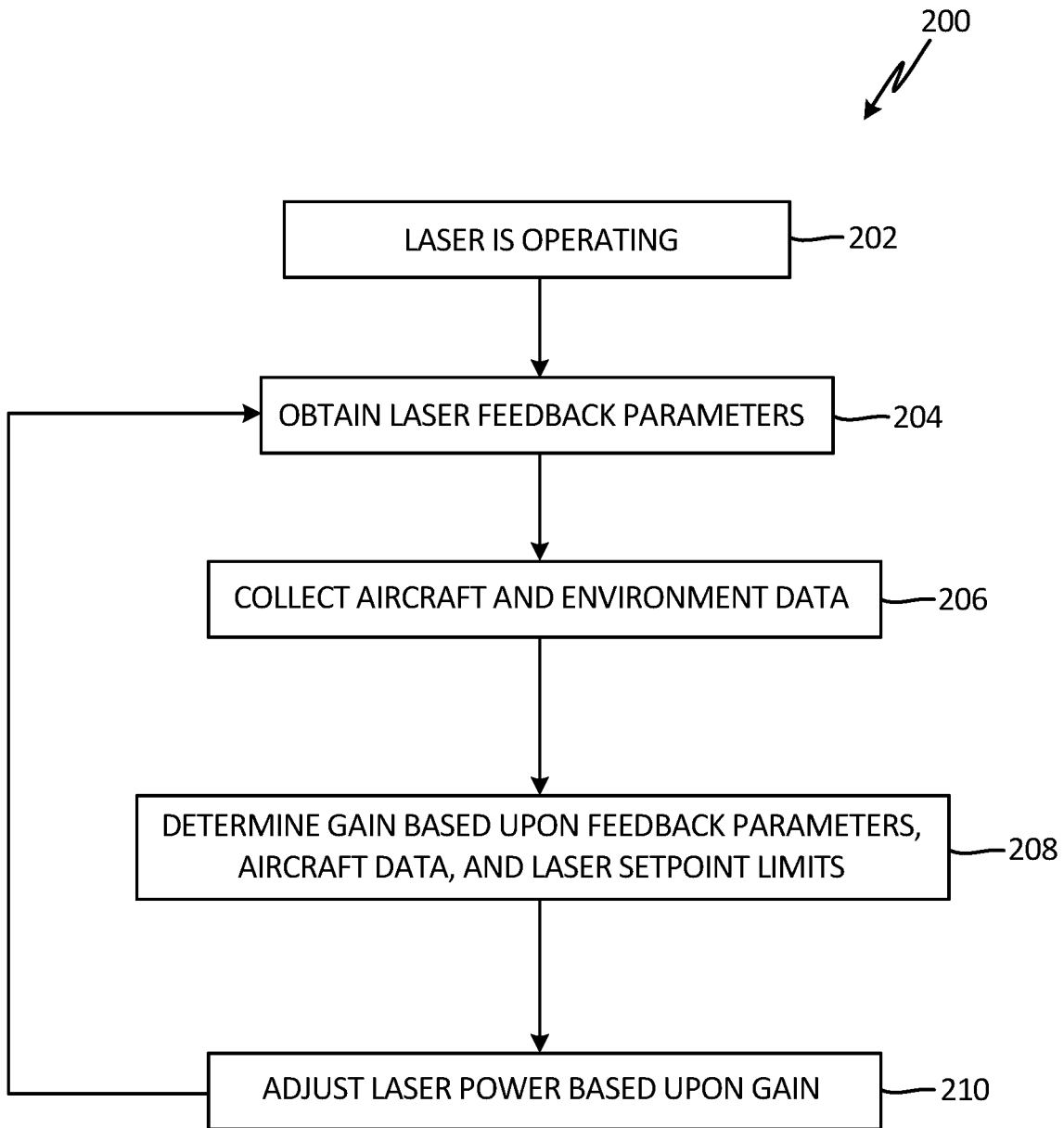
FIG. 3 is a flowchart illustrating a method of providing automatic gain control for a laser sensing system.

FIG. 3 is a flowchart illustrating method 200 of providing automatic gain control for laser sensing system 12. For the embodiment illustrated in FIG. 3, laser sensing system 12 is a laser air data sensing system. In other embodiments, laser sensing system 12 may be any other aircraft optical sensor. At step 202, aircraft 10 is operating and laser sensing system 12 is performing normal system operation. For example, laser sensing system 12 may be in an in-flight operating mode, as described above for step 110 of method 100 (FIG. 2). At step 204, feedback parameters 26 (FIG. 1) are obtained by controller 18.

Feedback parameters may include, among others, signal intensity and signal-to-noise ratio. These parameters may be measured at the detector 22. For example, a signal-to-noise ratio may be determined from values obtained from a detector, such as a photo-diode, of laser sensing system 12. A reference intensity, or a known background noise value, may be compared with a current detector output to determine the signal-to-noise ratio. This determination may be made by controller 18 or other circuitry of laser sensing system 12. The intensity of the laser may be directly measured at the output of the laser emitter, or external to optics of laser sensing system 12. Thus, the adjustment of power to laser sensing system 12 may also be utilized to account for a dirty window or other situation in which the optical transmission of the laser is impeded.

The laser power may also be adjusted based upon aircraft and environmental data. At step 206, aircraft and environmental data may be collected, for example, using sensors 14, avionics 16, and/or other onboard systems. This data may include, among others, aircraft velocity, temperature, pressure, flight phase, and altitude.

At step 208, a gain for the laser of laser sensing system 12 is determined based upon the factors determined at steps 204 and 206. The gain may be set with respect to the maximum laser power, for example. At step 210, the laser power is adjusted based upon the determined gain. The laser power may be controlled by controller 18, for example, by controlling a current to the laser for a single stage laser, or using an amplifier stage for other laser types, such as master-slave lasers. Any other method of controlling the power to the laser may be utilized. The laser power may also be controlled to remain within power limits of the laser, for example. These limits may be set based upon a maximum power the laser can handle, and a power that results in minimum signal intensity required for laser sensing system 12 to operate.

Method 200 may be utilized to account for varying molecular density at different altitudes, for example. Particulate count can also cause an increase in reflected energy received by emitter and detector 22. However, particulates generally reflect energy at very specific spectral widths, while molecules broaden the spectral content. Thus, the reflected energy from particulates may be filtered by wavelength to obtain the molecular reflections. With the particulate reflection filtered, method 200 may be utilized to adjust the power provided to laser sensing system 12 to account for the present molecular content of the atmosphere.

Discussion of Possible Embodiments

The following are non-exclusive descriptions of possible embodiments of the present invention.

A method of controlling power for a laser sensing system on an aircraft, wherein a laser of the laser sensing system is emitted into an atmosphere external to the aircraft, the method includes powering the laser sensing system at a first power level; obtaining, by a controller of the laser sensing system, feedback parameters regarding the laser, wherein the feedback parameters are indicative of molecular content of the atmosphere; determining, by the controller, a gain based upon the feedback parameters; and adjusting the first power level to a second power level based upon the gain.

The method of the preceding paragraph can optionally include, additionally and/or alternatively, any one or more of the following features, configurations and/or additional components:

A further embodiment of the foregoing method, further including receiving, by a detector of the laser sensing system, backscatter of the laser from the atmosphere; and determining, by the controller, conditions of the atmosphere based upon values obtained from the detector.

A further embodiment of any of the foregoing methods, wherein the feedback parameters includes at least a present laser power level and a signal-to-noise ratio of the laser sensing system determined from the values obtained from the detector.

A further embodiment of any of the foregoing methods, wherein adjusting the first power level to the second power level includes adjusting the first power level to the second power level such that the second power level is less than or equal to a maximum laser power, and wherein the second power level maintains a minimum laser signal intensity.

A further embodiment of any of the foregoing methods, further including determining that the aircraft is operating in an in-flight operating mode.

A further embodiment of any of the foregoing methods, further including obtaining, by at least one aircraft sensor, aircraft sensed data; and providing the aircraft sensed data to the controller.

A further embodiment of any of the foregoing methods, wherein determining, by the controller, the gain includes determining, by the controller, the gain based on the feedback parameters and the aircraft sensed data.

A laser sensing system includes an emitter configured to emit a laser, and a controller. The intensity of the laser is based upon power provided to the laser sensing system. The controller is configured to control the power provided to the laser sensing system, obtain feedback parameters indicative in part of molecular content of the atmosphere, and control the power provided to the laser sensing system based upon the feedback parameters.

The laser sensing system of the preceding paragraph can optionally include, additionally and/or alternatively, any one or more of the following features, configurations and/or additional components:

A further embodiment of the foregoing system, wherein the controller is further configured to maintain the power between a maximum power level and a lower power level corresponding to a minimum signal intensity of the laser.

A further embodiment of any of the foregoing systems, wherein the controller is further configured to determine that an aircraft that includes the laser sensing system is in flight, and control the power while the aircraft is in flight.

A further embodiment of any of the foregoing systems, wherein the laser sensing system is implemented onboard an aircraft, and wherein the controller is configured to receive aircraft sensed data from at least one aircraft sensor, and wherein the controller is further configured to control the power provided to the laser sensing system based upon the aircraft sensed data.

A further embodiment of any of the foregoing systems, further including a laser driver; and a detector configured to receive backscatter from the atmosphere, wherein the controller is configured to obtain values from the detector to determine conditions of the atmosphere.

A further embodiment of any of the foregoing systems, wherein the feedback parameters includes at least a present laser power level and a signal-to-noise ratio of the values from the detector.

An aircraft system includes a laser sensing system configured to emit a laser into atmosphere external to the aircraft, and a controller. The controller is configured to receive feedback parameters indicative at least in part of molecular content of the atmosphere and is configured to adjust power to the laser sensing system based upon the feedback parameters.

The aircraft system of the preceding paragraph can optionally include, additionally and/or alternatively, any one or more of the following features, configurations and/or additional components:

A further embodiment of the foregoing system, wherein the controller is further configured to maintain the power to the laser sensing system between a maximum power level and a lower power level corresponding to a minimum signal intensity of the laser.

A further embodiment of any of the foregoing systems, wherein the controller is further configured to determine that the aircraft is in flight, and control the power while the aircraft is in flight.

A further embodiment of any of the foregoing systems, further comprising at least one aircraft sensor, wherein the controller is configured to receive aircraft sensed data from the at least one aircraft sensor, and wherein the controller is further configured to adjust the power to the laser sensing system based upon the aircraft sensed data.

A further embodiment of any of the foregoing systems, wherein the laser sensing system includes a laser driver and a detector, wherein the detector is configured to receive backscatter from the atmosphere, and wherein the controller is configured to obtain values from the detector to determine conditions of the atmosphere.

A further embodiment of any of the foregoing systems, wherein the feedback parameters includes at least a present laser power level and a signal-to-noise ratio of the values from the detector.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of controlling power for a laser sensing system on an aircraft, the method comprising:
    powering the laser sensing system at a laser power level;
    emitting a laser beam into an atmosphere external to the aircraft;
    receiving, by a detector of the laser sensing system, backscatter of the laser beam from the atmosphere;
    obtaining, by a controller of the laser sensing system, feedback parameters from the detector regarding the backscatter of the laser beam;
    filtering, by the controller, the backscatter of the laser beam by wavelength to remove particulate reflections, wherein the filtering produces a molecular-specific signal intensity or a molecular-specific signal-to-noise ratio;
    determining, by the controller, an adjusted laser power level based upon the molecular-specific intensity or the molecular-specific signal-to-noise ratio required to meet sensor performance needs of the aircraft; and
    adjusting the laser power level to the adjusted laser power level.

2. The method of claim 1, further comprising:
    determining, by the controller, conditions of the atmosphere based upon values obtained from the detector.

3. The method of claim 1, wherein filtering the backscatter of the laser beam further produces a molecular-specific present laser power level.

4. The method of claim 1, wherein adjusting the laser power level to the adjusted laser power level comprises adjusting the laser power level to the adjusted laser power level such that the adjusted laser power level is less than or equal to a maximum laser power, and wherein the adjusted laser power level maintains a minimum laser signal intensity.

5. The method of claim 1, further comprising determining that the aircraft is operating in an in-flight operating mode.

6. The method of claim 1, further comprising:
    obtaining, by at least one aircraft sensor, aircraft sensed data; and
    providing the aircraft sensed data to the controller.

7. The method of claim 6, wherein determining, by the controller, the adjusted laser power level comprises determining, by the controller, the adjusted laser power level based on molecular-specific intensity or signal-to-noise ratio and the aircraft sensed data.

8. A laser sensing system comprising:
    an emitter configured to emit a laser beam, wherein an intensity of the laser beam is based upon power provided to the laser sensing system;
    a detector configured to receive backscatter of the laser beam from the atmosphere; and
    a controller configured to control the power provided to the laser sensing system;
    wherein the controller is configured to obtain feedback parameters from the detector regarding the backscatter of the laser beam and to filter the backscatter of the laser beam, by wavelength, to produce a molecular-specific intensity or a molecular-specific signal-to-noise ratio, and wherein the controller is further configured to control the power provided to the laser sensing system based upon the molecular-specific intensity or the signal-to-noise ratio to meet the sensor performance needs of the aircraft.

9. The laser sensing system of claim 8, wherein the controller is further configured to maintain the power between a maximum power level and a lower power level corresponding to a minimum signal intensity of the laser.

10. The laser sensing system of claim 8, wherein the controller is further configured to determine that an aircraft that includes the laser sensing system is in flight, and control the power while the aircraft is in flight.

11. The laser sensing system of claim 8, wherein the laser sensing system is implemented onboard an aircraft, and wherein the controller is configured to receive aircraft sensed data from at least one aircraft sensor, and wherein the controller is further configured to control the power provided to the laser sensing system based upon the aircraft sensed data.

12. The laser sensing system of claim 8, further comprising:
    a laser driver; and
    wherein the controller is configured to obtain values from the detector to determine conditions of the atmosphere.

13. The laser sensing system of claim 12, wherein filtering the the backscatter of the laser beam further produces a present laser power level.

14. An aircraft system comprising:
    a laser sensing system configured to emit a laser beam into an atmosphere external to the aircraft; and
    a controller configured to produce a molecular-specific intensity or a molecular-specific signal-to-noise ratio by:
        receiving feedback parameters regarding a backscatter of the emitted laser beam; and
        filtering the backscatter, by wavelength, to remove particulate reflections, the filtering producing the molecular-specific intensity or the molecular-specific signal-to-noise ratio;

wherein the controller is configured to adjust power to the laser sensing system based upon the molecular-specific intensity or the molecular-specific signal-to-noise ratio to meet the sensor performance needs of the aircraft.

15. The aircraft system of claim 14, wherein the controller is further configured to maintain the power to the laser sensing system between a maximum power level and a lower power level corresponding to a minimum signal intensity of the laser.

16. The aircraft system of claim 14, wherein the controller is further configured to determine that the aircraft is in flight, and control the power while the aircraft is in flight.

17. The aircraft system of claim 14, further comprising at least one aircraft sensor, wherein the controller is configured to receive aircraft sensed data from the at least one aircraft sensor, and wherein the controller is further configured to adjust the power to the laser sensing system based upon the aircraft sensed data.

18. The aircraft system of claim 14, wherein the laser sensing system includes a laser driver and a detector, wherein the detector is configured to receive the backscatter from the atmosphere, and wherein the controller is configured to obtain values from the detector to determine conditions of the atmosphere.

19. The aircraft system of claim 18, wherein filtering the backscatter produces a present laser power level.

\* \* \* \* \*